No. 620,075. Patented Feb. 21, 1899.
G. P. JONES.
DIVIDED CRANK AXLE.
(Application filed July 30, 1897.)
(No Model.)
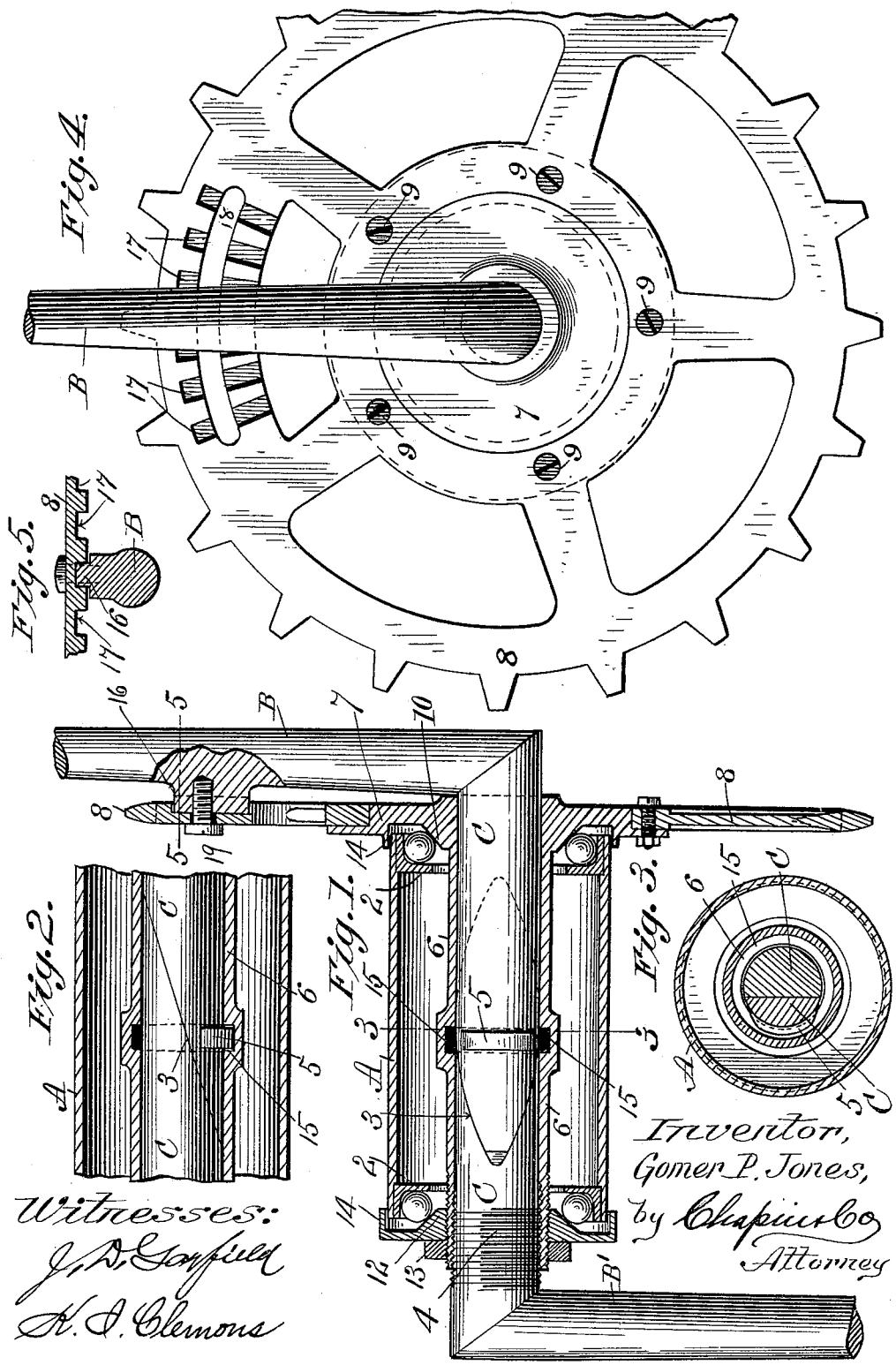
Witnesses:
J. D. Gayfield
H. I. Clemons
Inventor,
Gomer P. Jones,
by Chapin & Co
Attorney

UNITED STATES PATENT OFFICE.

GOMER PHILLIP JONES, OF SPRINGFIELD, MASSACHUSETTS, ASSIGNOR TO MORO D. STEBBINS, OF SAME PLACE.

DIVIDED CRANK-AXLE.

SPECIFICATION forming part of Letters Patent No. 620,075, dated February 21, 1899.

Application filed July 30, 1897. Serial No. 646,566. (No model.)

*To all whom it may concern:*

Be it known that I, GOMER PHILLIP JONES, a citizen of the United States of America, residing at Springfield, in the county of Hampden and State of Massachusetts, have invented new and useful Improvements in Divided Crank-Axles, of which the following is a specification.

This invention relates to divided crank-axles for use in bicycle or other constructions, and has for its object the production of means for uniting the ends of said crank-axle between the cranks, whereby the union thereof is greatly simplified, strengthened, and cheapened.

This invention consists in the construction as described and claimed in the accompanying specification and shown in the drawings.

Referring to the drawings forming part of this specification, Figure 1 shows a side elevation of the divided crank-axle as applied to a bicycle crank-hanger, some of the parts being shown in section. Fig. 2 is a view of the central part of the axle, taken at right angles to the positions thereof shown in Fig. 1. Fig. 3 is a cross-section taken on line 3 3, Fig. 1. Fig. 4 is an end view of Fig. 1, showing the driving sprocket-wheel and the relation of the crank thereto. Fig. 5 is a section through one of the cranks on line 5 5, Fig. 1.

In the drawings, A represents the crank-hanger of a bicycle-frame, having in each end thereof the ball-cups 2 2. The cranks B B' are each made integral with part of the axle C, which is round, and substantially one-half of the axle forms part of each of said cranks B B' and is located at right angles thereto. The ends of the axle are beveled off in a plane parallel with the line of said cranks, the degree of inclination to the axis of the axle of said beveled ends being such that the extremities of the axle, when said beveled ends are applied to one another, as shown in Figs. 1 and 2 at 3, will lap to the extent of about one-third of the length of the axle between the cranks.

On that part of the axle forming part of the left-hand crank B' and on that part thereof contiguous to the crank is cut a left-hand screw-thread 4. An annular projection 5 is located on the axle part forming part of the crank B, at any convenient point in the length of that portion of the axle which is beveled, but preferably near the end of said axle, and projects at right angles to the axis thereof.

A sleeve 6 is provided for the reception of the axle parts C C of the cranks B B', the interior diameter of which slightly exceeds the diameter of the said axle. Obviously the said axle parts C C cannot fit closely in said sleeve, or it would not be possible to enter that part of the axle having the lug 5 thereon in the recess or groove 15 in said sleeve. Said parts C C are of a somewhat smaller diameter than the interior of the sleeve, as shown in Fig. 3, though the difference in the diameters of the said parts is somewhat exaggerated in this figure for the sake of clearness. On one end of said sleeve at right angles thereto and preferably integral therewith is the circular flange 7, to which the sprocket-wheel 8 is secured by screws 9, as shown, or in any other suitable manner. A cone 10 is turned up on the inside face of said flange 7 where it joins the sleeve 6, on which cone the balls in the cups 2 bear. The cone 12 for the opposite end of the bearing is screwed onto the end of the sleeve 6, as shown, and a suitable check-nut 13 locks said cone in any desired position. Said cones 10 and 12 are flanged, as shown in Fig. 1, in the usual manner for overlapping the end of the crank-hanger A to exclude the dust therefrom. These flanges are represented by 14 14. Obviously the cone 10 may be made separate from the sleeve 6, if desired, and secured thereon in any convenient manner. The inner end of the sleeve 6 opposite the flange 7 is threaded to correspond with the screw-thread 4 cut on the axle, forming part of the crank B'.

In the interior surface of the sleeve 6, at a point which would lie opposite the projection 5 when the two beveled ends of the axle are applied to each other in proper position within said sleeve, as shown in Figs. 1 and 2, is formed the annular groove 15 of substantially the same width and somewhat deeper than the height of said projection above the surface of the axle. When the end of the axle C on the crank B is entered in said sleeve 6, this part of the axle, being less than a cylinder, may be swung a little to one side, so that the projection 5 may be brought in line with groove 15 in the sleeve, when this part of the axle may be swung so that the projection 5 engages with said groove 15, and when the opposite crank-axle B' is entered into the said sleeve and rotated to screw it into engagement therewith the crank B is rotated by the engagement of the beveled ends of both axle parts, but the said axle portion, while it has a free rotary motion in the sleeve at that time, is prevented from any endwise motion therein by the engagement of projection 5 with the groove 15. The extension of the beveled portion of the threaded axle C past the portion with the projection 5 thereon forces the projection 5 into groove 15 and retains it there. The engagement of the said projection 5 on the axle C with the groove 15 in the sleeve 6 when the crank B' and the portion of the axle C forming part thereof have been screwed into the sleeve 6 locks the sleeve securely to the axle part. Both axles continue rotating together in the sleeve 6, and the beveled end of the axle part on the crank B' slides along the beveled face of the opposite axle part until both axle parts are forced tightly against the walls of the inclosing sleeve 6 by reason of the contact of these beveled ends and the forced approach of the cranks one to the other by the screwing of the one in one end of the sleeve 6 and the retention of the other of said cranks in the sleeve by the engagement of the said projection 5 thereon with the groove 15.

The thread 4 on the left-hand crank-axle being a left-hand thread, force applied thereto to drive the machine forward would tighten the connection between the axle parts and the sleeve 6 were not the latter secured together to rotate as one, as hereinafter described, and likewise a back-pedaling motion would tend to unscrew the crank B', but the right-hand crank B is secured to the sprocket-wheel 8, preferably as shown in Figs. 1, 4, and 5, though any manner of connection which will attach the crank B to the sleeve so that they will rotate together may be employed.

The manner of making the connections of the crank B and sprocket, as shown in the drawings, is as follows: On the crank B is a boss 16, (either integral therewith or attached thereto,) which boss engages with suitable radially-disposed notches or slots 17 cut in the sprocket-wheel. A slot 18, concentric with the axle, divides said notches 17, and a screw 19, passing through said slot and engaging with the boss 16, serves to lock the crank B in engagement with any one of the said notches.

In case it should become necessary to screw up the crank B' into firmer engagement with the sleeve 6 the screw 19 is removed and the sprocket-wheel also removed from the flange 7, and the crank B' is then screwed up to a firmer engagement with the sleeve 6, care being taken to secure the proper alinement of the boss 16 with one of the notches 17 of the sprocket-wheel with which said boss engages. The sprocket-wheel is then replaced, and by means of the screw 19 the sprocket and the crank B are secured to each other.

It is obvious that if the crank B is prevented from rotating independent of the sleeve 6 no disengagement of either of the cranks from said sleeve is possible.

The construction herein described is exceedingly strong and simple and inexpensive. No check-nuts are required to lock the parts, and the adjustment of the ball-bearings is in no wise changed.

For the purposes of this specification this divided crank-axle is shown as applied to a bicycle; but it is obviously applicable to other constructions where it would be desirable to have an axle and its cranks in practically one piece.

Having thus described my invention, what I claim, and desire to secure by Letters Patent, is—

1. A two-part crank-axle, each part consisting of a crank and an integral shaft-section, the two shaft-sections having overlapping bevels, one of said sections having a projection on its outer surface at such part of the beveled shaft-section as forms less than a semicylinder, combined with a sleeve having a recess into which said projection extends, the overlapping bevels holding the projection on the one shaft-section into the recess in the sleeve, substantially as described.

2. A two-part crank-axle each part consisting essentially of a crank and a shaft-section, the two shaft-sections having beveled proximate faces and together forming a substantially cylindrical shaft, one of said sections having an external projection from its outer cylindrical surface at a point where the diameter of the section below the projection is less than half a cylinder, a sleeve with a recess therein to inclose the divided axle and receive the projection thereon, and means for securing one of the axle-sections to the sleeve to prevent independent rotation, all combined substantially as described.

GOMER PHILLIP JONES.

Witnesses:
 WM. H. CHAPIN,
 J. D. GARFIELD.